(12) United States Patent
Hoffmann et al.

(10) Patent No.: US 8,151,957 B2
(45) Date of Patent: Apr. 10, 2012

(54) ANTI-ROTATION MECHANISM FOR A CLOSED PISTON TORQUE CONVERTER

(75) Inventors: Joachim Hoffmann, Achern-Grossweier (DE); Thomas Heck, Wooster, OH (US); Ryan Cmich, Sharon Township, OH (US); Jonathan G. Jameson, Dalton, OH (US)

(73) Assignee: Schaeffer Technologies AG & Co. KG, Herzogenaurach (DE)

( * ) Notice: Subject to any disclaimer, the term of this patent is extended or adjusted under 35 U.S.C. 154(b) by 550 days.

(21) Appl. No.: 12/315,999

(22) Filed: Dec. 9, 2008

(65) Prior Publication Data

US 2009/0152068 A1 Jun. 18, 2009

Related U.S. Application Data

(60) Provisional application No. 61/007,308, filed on Dec. 12, 2007.

(51) Int. Cl.
*F16H 45/02* (2006.01)
(52) U.S. Cl. ............... 192/3.3; 192/3.29; 92/165 PR
(58) Field of Classification Search ............ 192/3.29, 192/3.3; 92/165 PR
See application file for complete search history.

(56) References Cited

U.S. PATENT DOCUMENTS

| 3,277,744 | A |  | 10/1966 | Stockton |
| 4,926,988 | A | * | 5/1990 | Kundermann ............... 192/3.3 |
| 6,508,345 | B1 | * | 1/2003 | Yoshimoto et al. .......... 192/3.25 |
| 6,634,474 | B2 |  | 10/2003 | Sasse et al. |
| 6,725,988 | B2 | * | 4/2004 | Bauer et al. ............... 192/3.29 |
| 7,077,253 | B2 |  | 7/2006 | Maienschein |
| 7,114,604 | B2 |  | 10/2006 | Masuya |
| 7,513,346 | B2 | * | 4/2009 | Degler et al. ............... 192/3.3 |
| 7,621,385 | B2 | * | 11/2009 | Samie et al. ............... 192/3.29 |
| 7,837,018 | B2 | * | 11/2010 | Nakamura ............... 192/3.3 |
| 7,891,473 | B2 | * | 2/2011 | Maienschein et al. ......... 192/3.3 |
| 2007/0246317 | A1 | * | 10/2007 | Tomiyama ............... 192/3.29 |

* cited by examiner

*Primary Examiner* — David D Le
*Assistant Examiner* — Jacob S Scott
(74) *Attorney, Agent, or Firm* — Simpson & Simpson, PLLC (57) ABSTRACT

A piston plate anti-rotate mechanism in a closed piston, three passage torque converter including a cover having an inner radial surface, a drive plate comprising an annular plate, a piston plate having an axial inner crown, a front annular edge, an axial skirt, and a back annular edge, wherein the cover, drive plate, and piston plate are operatively arranged to rotate about a transverse axis of rotation, and wherein the piston plate is attached to the cover or the drive plate such that the piston plate is axially moveable and rotationally immovable relative to the cover. In some embodiment, the present invention further includes a leaf spring attaching the piston plate to the cover or the drive plate, such that the piston plate is axially moveable and rotationally immovable relative to the cover.

3 Claims, 11 Drawing Sheets

ANTI-ROTATION MECHANISM FOR A CLOSED PISTON TORQUE CONVERTER

CROSS-REFERENCE TO RELATED APPLICATIONS

This application claims the benefit under 35 U.S.C. §119 (e) of U.S. Provisional Application No. 61/007,308 filed on Dec. 12, 2007 which application is incorporated herein by reference.

FIELD OF THE INVENTION

The present invention broadly relates to mechanisms for preventing the rotation of a piston plate in a torque converter. In particular, the present invention relates to mechanisms for preventing the rotation of a clutch piston in a closed piston, three-passage torque converter.

BACKGROUND OF THE INVENTION

In closed piston, three-passage torque converters, the clutch piston divides the cooling oil circuit and the apply circuit. The piston has large seals at its inside diameter (ID) and outside diameter (OD). These seals are designed for axially directed movement of the piston, but are not durable to rotation about the central axis of rotation. As engine torsionals act directly on the outer mating components of these seals, but not on the piston itself, the piston inertia creates a driving force counter to that of the outer mating components, which results in rotation relative to these components. Consequently, the torque converter generally includes a means for preventing this relative rotation.

In prior designs, the rotation is prevented via a splined engagement. Pistons are generally made of die-cast aluminum and have precision splines formed on their ID. The splines engage mating external splines formed into a forged hub member attached to the cover of the converter. Unfortunately, this splined arrangement is costly, difficult to implement on a stamped piston, and is prone to rattle. Rattling is particularly an issue on large diesel engines.

Thus, there is a long-felt need for an anti-rotation mechanism for a closed piston, three-passage torque converter that does not rattle.

There is also a long-felt need for an anti-rotation mechanism for a closed piston, three-passage torque converter that is cost effective and may be implemented on a stamped piston.

There is also a long-felt need for an anti-rotation mechanism for a closed piston, three-passage torque converter that mitigates or eliminates rattling during operation.

BRIEF SUMMARY OF THE INVENTION

The present invention broadly comprises a piston plate anti-rotate mechanism in a closed piston, three passage torque converter comprising: a cover having an inner radial surface; a drive plate comprising an annular plate; a piston plate having an axial inner crown, a front annular edge, an axial skirt, and a back annular edge, wherein the cover, drive plate, and piston plate are operatively arranged to rotate about a transverse axis of rotation, and wherein the piston plate is attached to the cover or the drive plate such that the piston plate is axially moveable and rotationally immovable relative to the cover.

In some embodiments, the present invention also comprises a generally flat, elongate leaf spring. The leaf spring comprises a first segment having a first aperture, a second aperture, and a tab, a second segment, and a third segment. In these particular embodiments, the piston plate further includes at least one plate cut in its axial skirt along its back annular edge, the drive plate comprises at least one aperture and is rotationally fixed to the cover, the at least one plate cut is operatively arranged to receive the third segment of the leaf spring, the third segment of the leaf spring is secured in the plate cut, the first segment of the leaf spring is attached to the drive plate via a rivet, the tab of the leaf spring extends into the aperture of the drive plate, thereby attaching the piston plate to the drive plate such that the piston plate is axially moveable and rotationally immovable relative to the cover.

In some embodiments of the present invention, the piston plate is directly attached to the drive plate via extruded sheet metal rivets or welding.

In another embodiment of the present invention, the cover includes a plurality of dogs, which slidingly and axially engage receiving elements on the piston plate.

It is a general object of the present invention to provide an anti-rotation mechanism for a closed piston, three-passage torque converter that mitigates or eliminates rattling during operation, is cost effective, and may be implemented on a stamped piston.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless otherwise defined, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

The present invention is anti-rotation mechanism for a closed piston, three-passage torque converter. In each embodiment of the present invention, unless asserted otherwise, closed piston torque converter 100 comprises impeller shell 90, cover 110, piston plate 130, and drive plate 80, all of which are operatively arranged to rotate about transverse axis X-X'. Hereinafter, the directional term "front" refers to that which is oriented towards X, and the directional term "rear" refers to that which is oriented towards X'. The term "axial" refers to that which extends generally along or parallel to axis X-X'. The term "radial" refers to that which extends substantially orthogonal from axis X-X'.

Cover 110 generally comprises radial wall 111 having inner radial surface 112. Cover 110 may further comprise radial annular component 114 fixedly attached to inner surface 112, in whole or in part, via an attachment means, such as, rivets 118 and 119. Piston plate 130 generally comprises axial inner crown 132, front annular edge 133, axial skirt 138, back annular edge 139, and may include first radial inner annular surface 134. Drive plate 80 generally comprises a radial annular plate.

Figure 1:
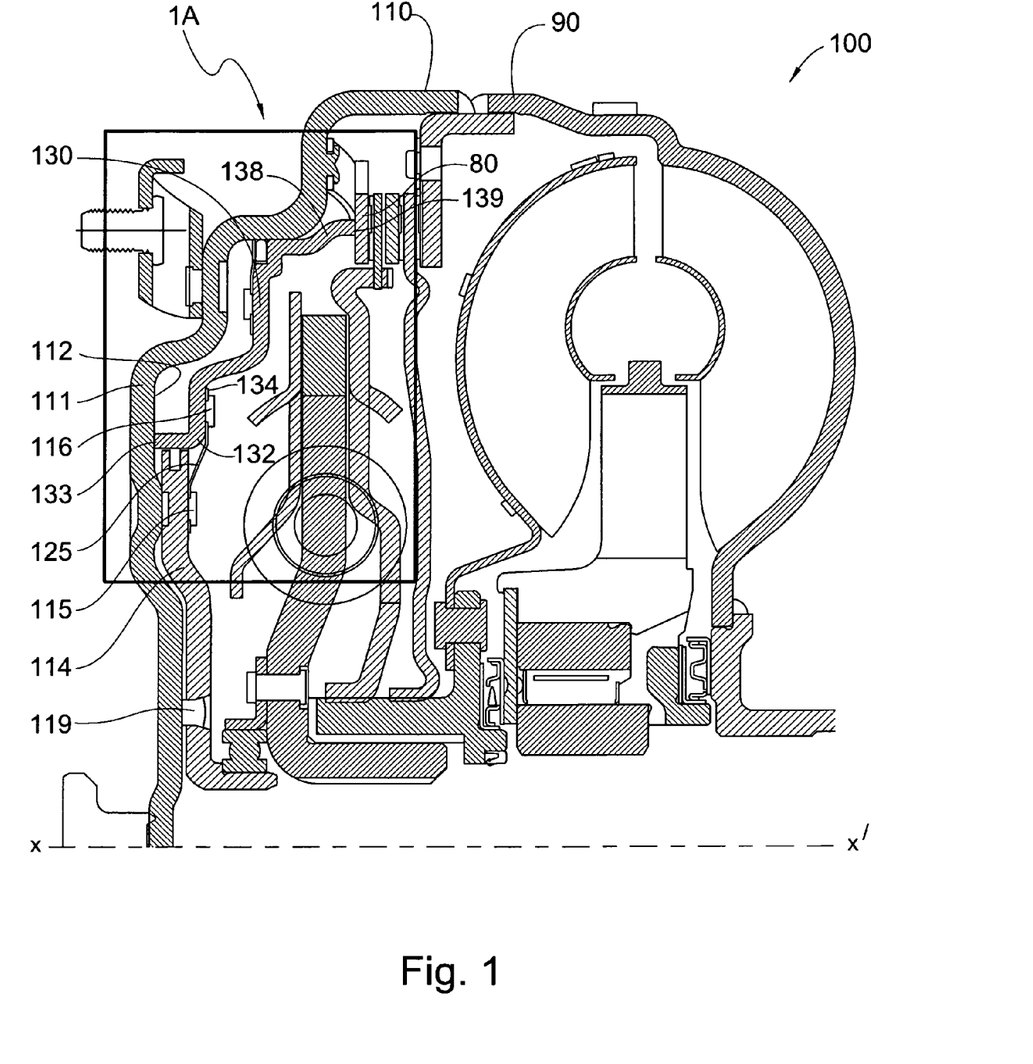
FIG. 1 is a partial cross-sectional view of a first embodiment of a present invention piston plate anti-rotate mechanism in a torque converter.
Figure 1A:
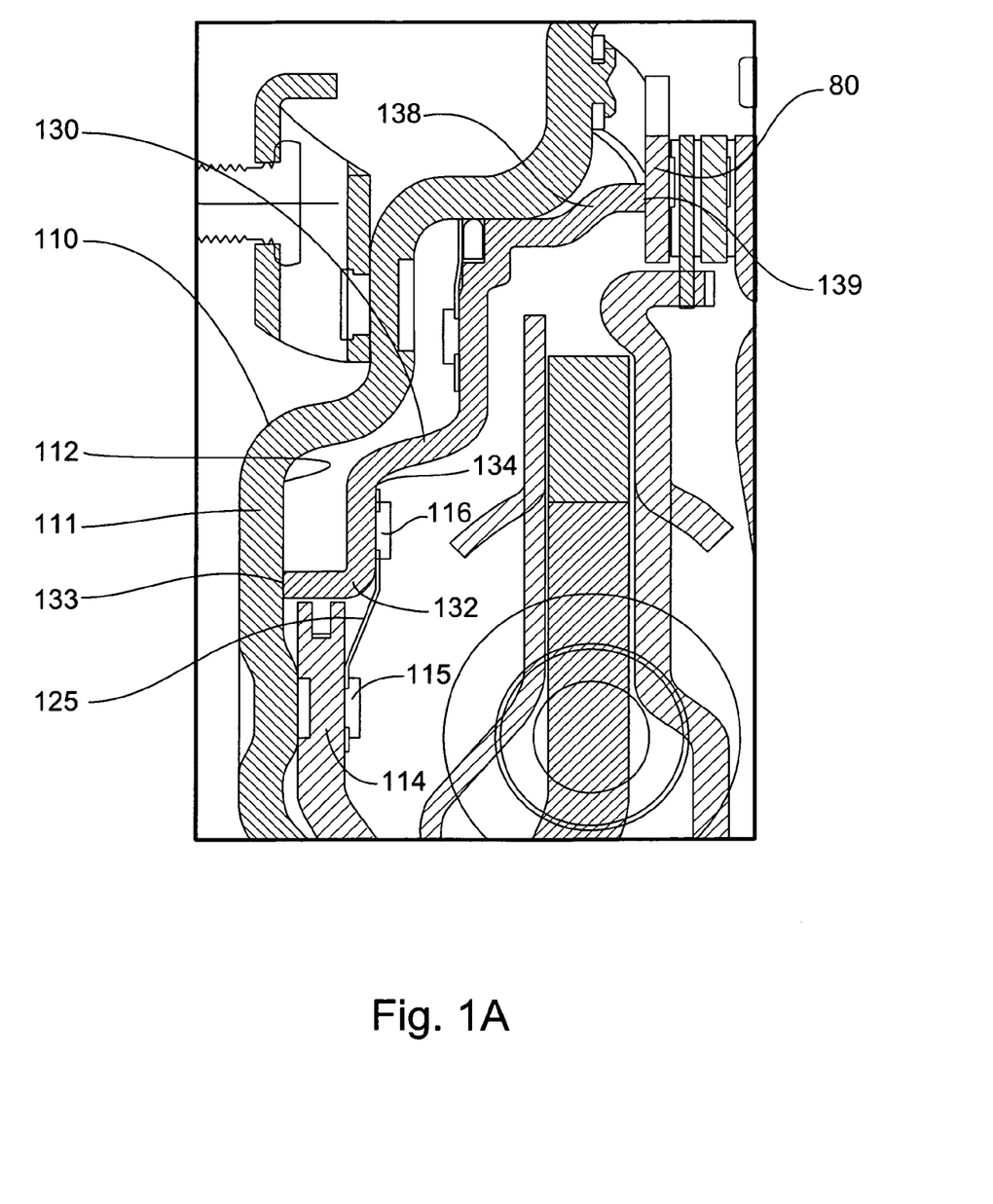
FIG. 1A is an enlarged view of area 1A shown in FIG. 1.

FIG. 1 is a partial cross-sectional view of a first embodiment of present invention piston plate attachment in a torque converter 100. FIG. 1A is an enlarged view of area 1A shown in FIG. 1. The first embodiment comprises leaf spring 125, which generally comprises a flat, elongated, flexible member, and may comprise connected individual segments or be of integral form. Leaf spring 125 is attached generally radially outward from component 114 to radial inner annular surface 134 of piston plate 130. Leaf spring 125 may be attached to component 114 and radial inner surface 134 by any means known in the art, for example, extruded rivets 115 and 116, respectively. Leaf spring 125 may be customized for particular torsional strengths, axial deflection, and packaging requirements by adjusting its angle from radial. During operation of closed, three passage torque converter 100, leaf spring 125 prevents piston plate 130 from rotating relative to cover 110, while allowing its axial movement.

Figure 2:
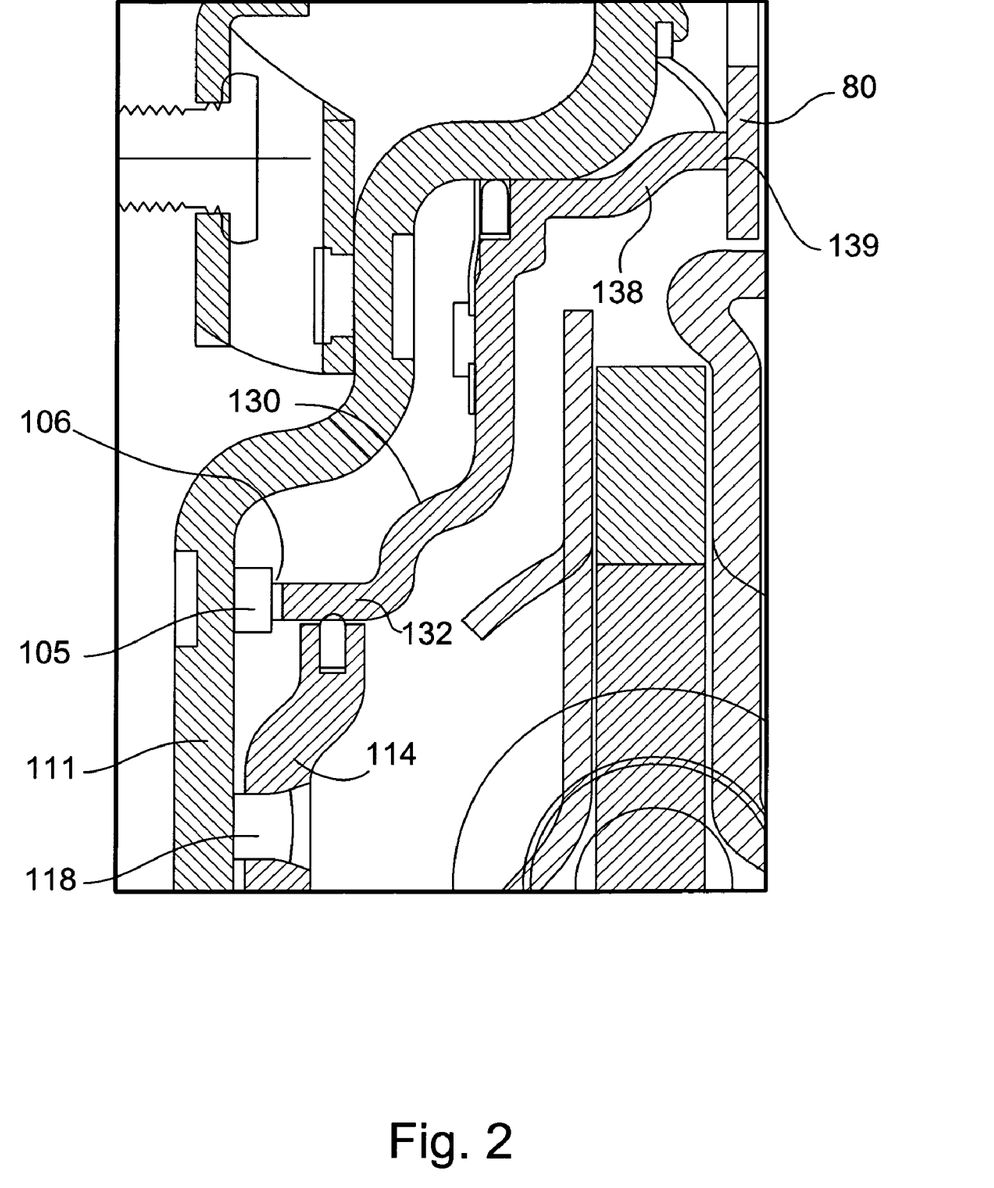
FIG. 2 is a second embodiment of the present invention piston plate anti-rotate mechanism in a torque converter.

FIG. 2 is a partial cross-sectional view of a second embodiment of present invention piston plate attachment in a torque converter 100. In this embodiment, which does not include leaf spring 125, cover 110 further comprises at least one dog 105, but preferably a plurality of dogs 105, axially extruding toward the rear from inner radial surface 112. Piston plate 130 further comprises at least one receiving element 106, but preferably a plurality of receiving elements 106, axially extending toward the front from front annular edge 133. The plurality of receiving elements 106 are operatively arranged to axially and slidingly engage the plurality of dogs 105. Once slidingly engaged, the plurality of dogs 105 prevents piston plate 130 from rotating relative to cover 110, while allowing its axial movement.

FIGS. 3-5A show the third embodiment of the present invention. In this embodiment, at least one leaf spring, but preferably a plurality of leaf springs, are used to secure the piston plate to the drive plate. The drive plate is rotationally fixed to the torque converter cover, for example, with leaf springs. In an alternative embodiment, however, the leaf spring attaches directly from the piston to the cover, for example, with extruded rivets.

Figure 3:
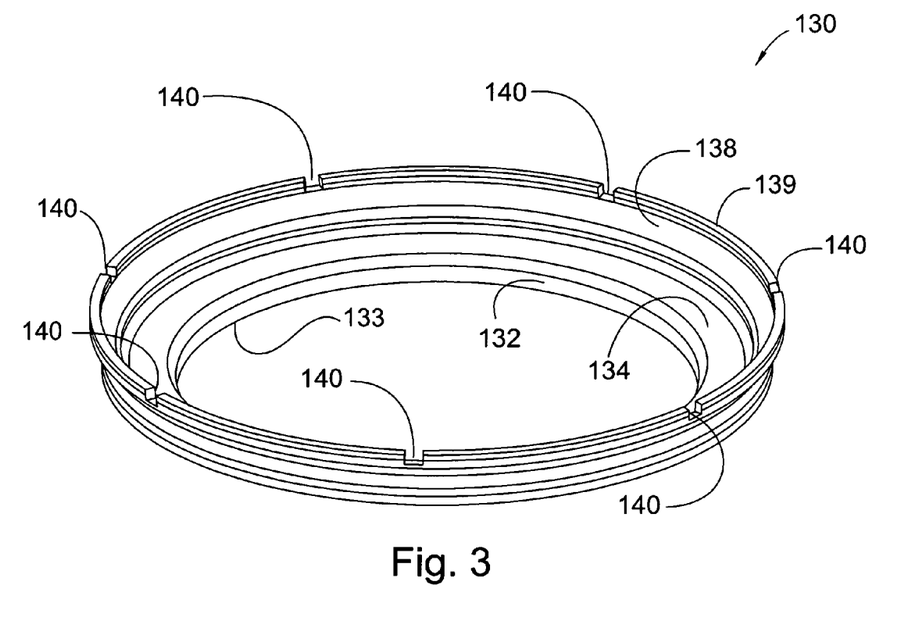
FIG. 3 is a perspective view of a piston plate of a third embodiment of the present invention piston plate anti-rotate mechanism in a torque converter.

FIG. 3 shows a perspective view of piston 130, which in this embodiment further comprises at least one plate cut 140, but preferably a plurality of plate cuts 140 for receiving a plurality of leaf springs 150.

Figure 4:
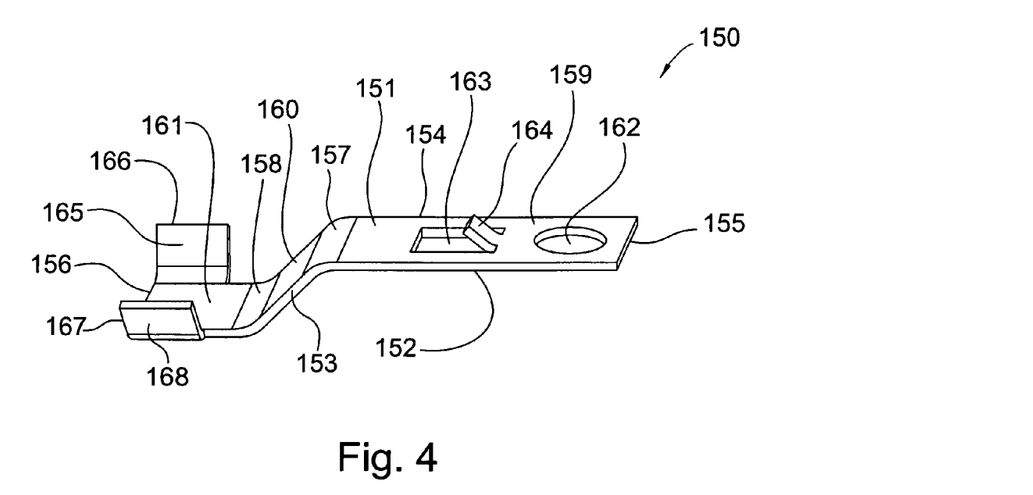
FIG. 4 is a perspective view of a leaf tab of the third embodiment.

FIG. 4 shows a perspective view of leaf spring 150, which is generally flat and elongate and comprises: top surface 151 and bottom surface 152; first end 155 and second end 156; sides 153 and 154; first segment 159, second segment 160, and third segment 161; and, bend 157, arranged between first segment 159 and second segment 160, and bend 158, arranged between second segment 160 and third segment 161. First segment 159 includes first aperture 162, second aperture 163, and tab 164. Third segment 161 includes wing tab 165 having outer surface 166, and wing tab 167 having outer surface 168.

Figure 5:
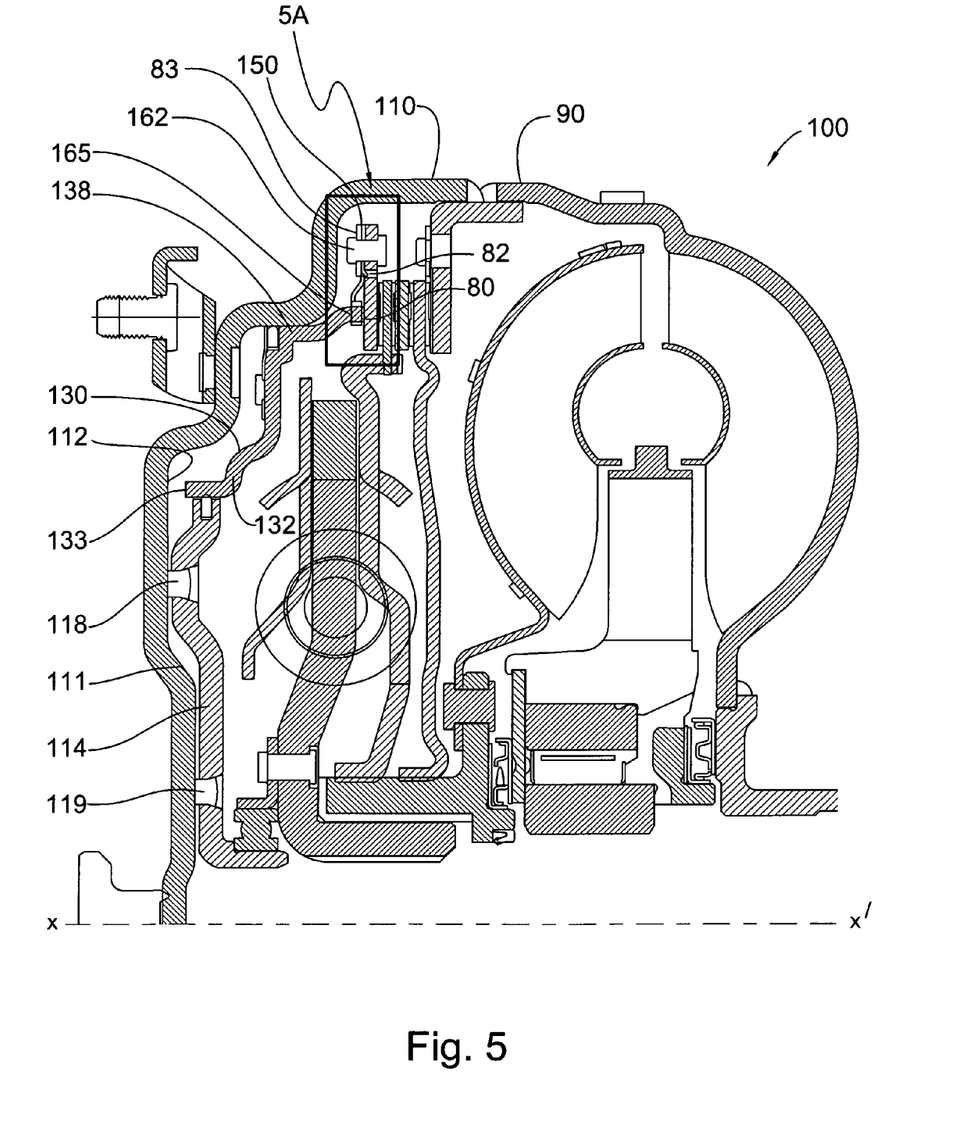
FIG. 5 is a partial cross-sectional view of the third embodiment of the present invention a piston plate anti-rotate mechanism in a torque converter.
Figure 5A:
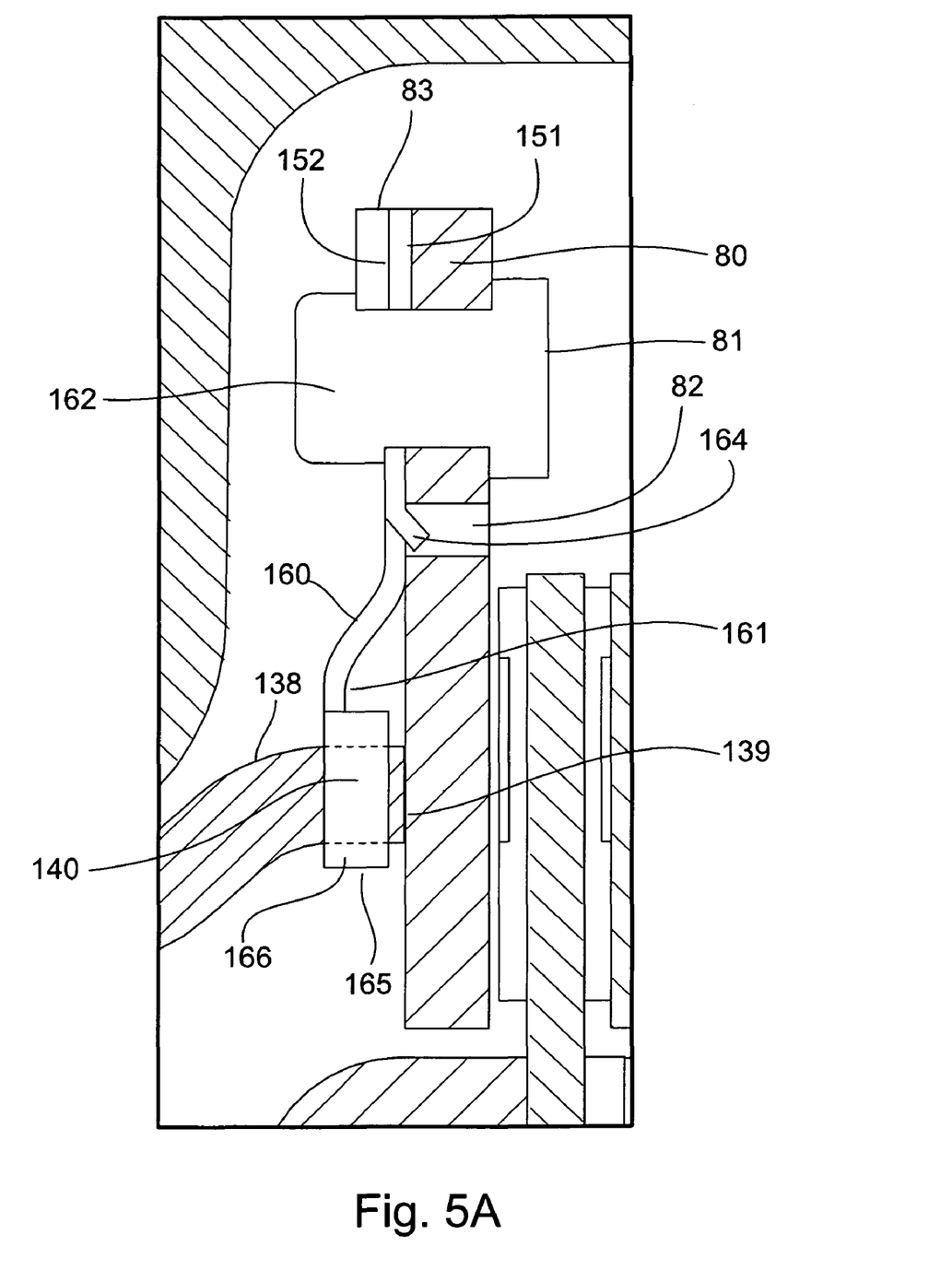
FIG. 5A is an enlarged view of area 1A shown in FIG. 5.

FIG. 5 is a partial cross-sectional view of the third embodiment of the present invention piston plate attachment in a torque converter 100. FIG. 5A is an enlarged view of area 5A shown in FIG. 5. As is shown in FIG. 5A, third segment 161 is disposed in plate cut 140. Plate cut 140 and leaf spring 150 are configured such that when third segment 161 is forced into plate cut 140, wing tabs 165 and 167 bend inward toward top surface 151, thereby creating a preload against plate cut 140 and securing third segment 161 in plate cut 140. Leaf spring 150 may be attached to drive plate 80 by any means known in the art. Preferably, it is attached via rivet 81 passing axially through drive plate 80 and aperture 162 of leaf spring 150. Tab 164 extends axially into aperture 82 of drive plate 80 in order to prevent leaf spring 150 rotating about rivet 81.

Figures 6, 6A, 7:
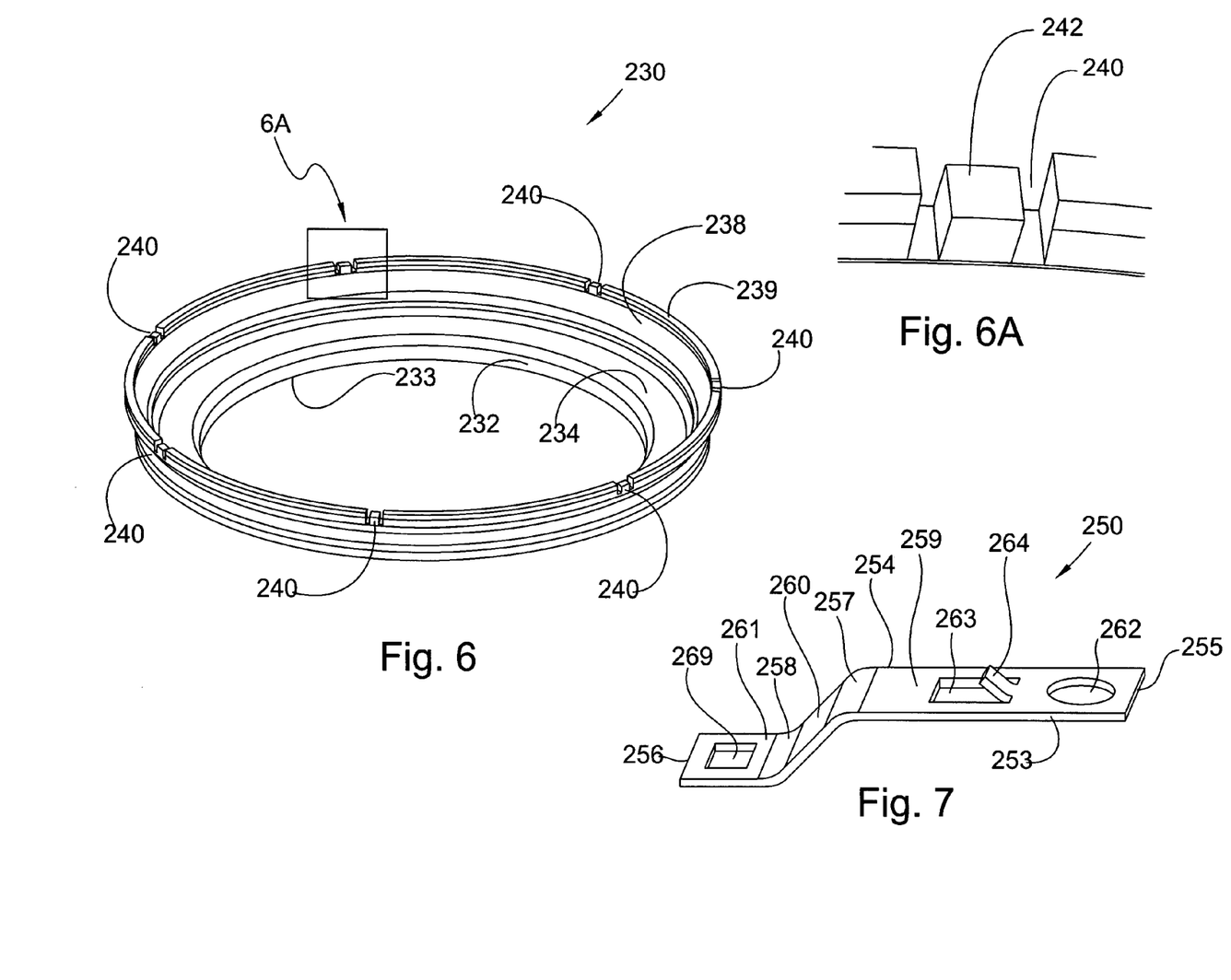
FIG. 6 is a perspective view of a piston plate of a fourth embodiment of the present invention piston plate anti-rotate mechanism in a torque converter.
FIG. 6A is an enlarged view of area 6A shown in FIG. 6.
FIG. 7 is a perspective view of a leaf tab of the fourth embodiment.

FIGS. 6-8A show the fourth embodiment of the present invention. In this embodiment, at least one leaf spring, but preferably a plurality of leaf springs, is used to secure the piston plate to the drive plate. The drive plate is rotationally fixed to the torque converter cover, for example, with leaf springs. In an alternative embodiment, however, the leaf spring attaches directly from the piston to the cover, for example, with extruded rivets. FIG. 6 shows a perspective view of piston 230, which in this embodiment further comprises at least one plate cut 240, but preferably a plurality of plate cuts 240 for receiving a plurality of leaf springs 250. Plate cut 240 includes peg 242 disposed generally in the middle of plate cut 240.

FIG. 7 shows a perspective view of leaf spring 250, which is generally flat and elongate and comprises: first end 255 and second end 256; sides 253 and 254; first segment 259, second segment 260, and third segment 261; and, bend 257, arranged between first segment 259 and second segment 260, and bend 258, arranged between second segment 260 and third segment 261. First segment 259 includes first aperture 262, second aperture 263, and tab 264. Third segment 261 includes aperture 269.

Figure 8:
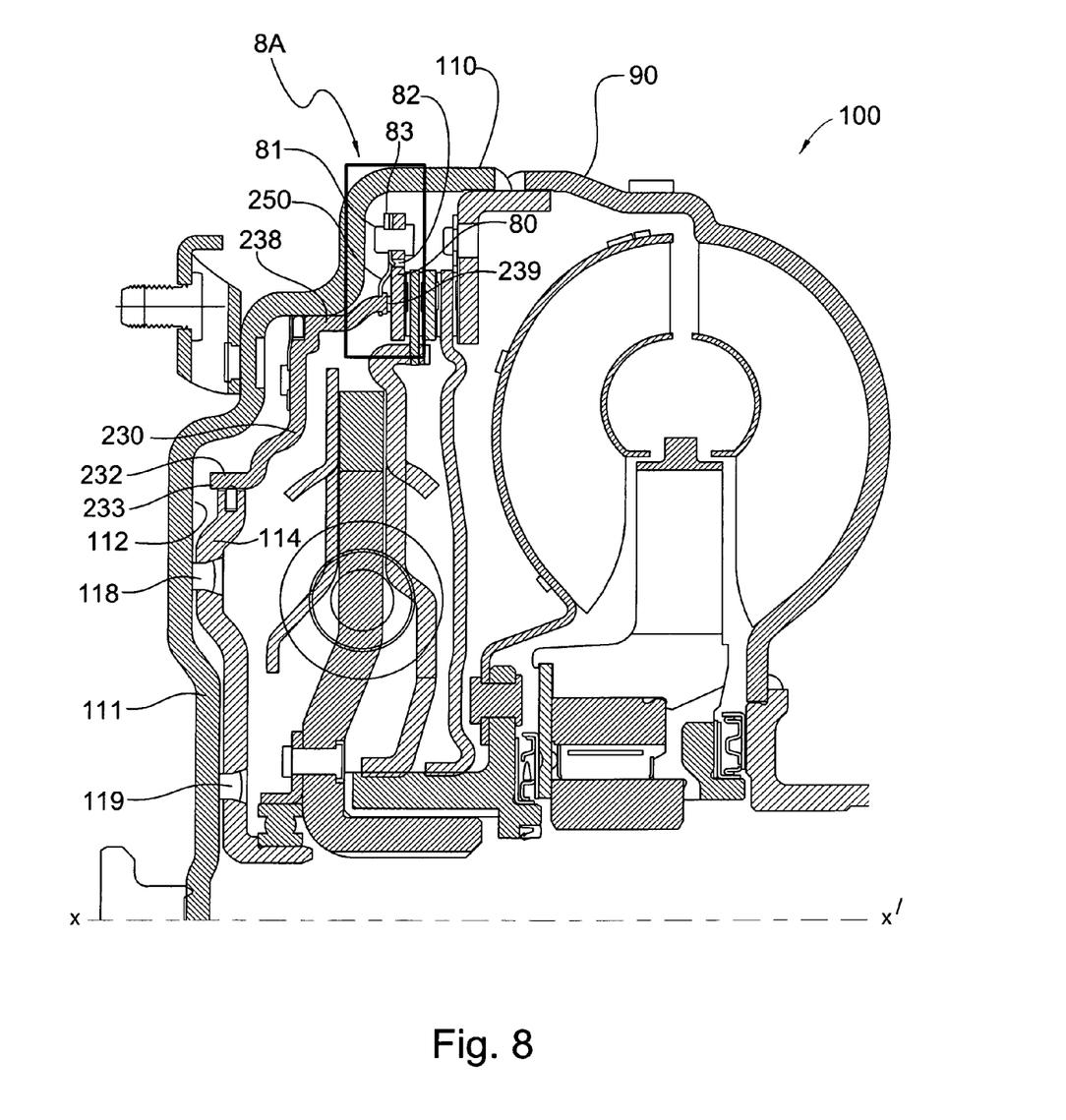
FIG. 8 is a partial cross-sectional view of the fourth embodiment of the present invention piston plate anti-rotate mechanism in a torque converter.
Figure 8A:
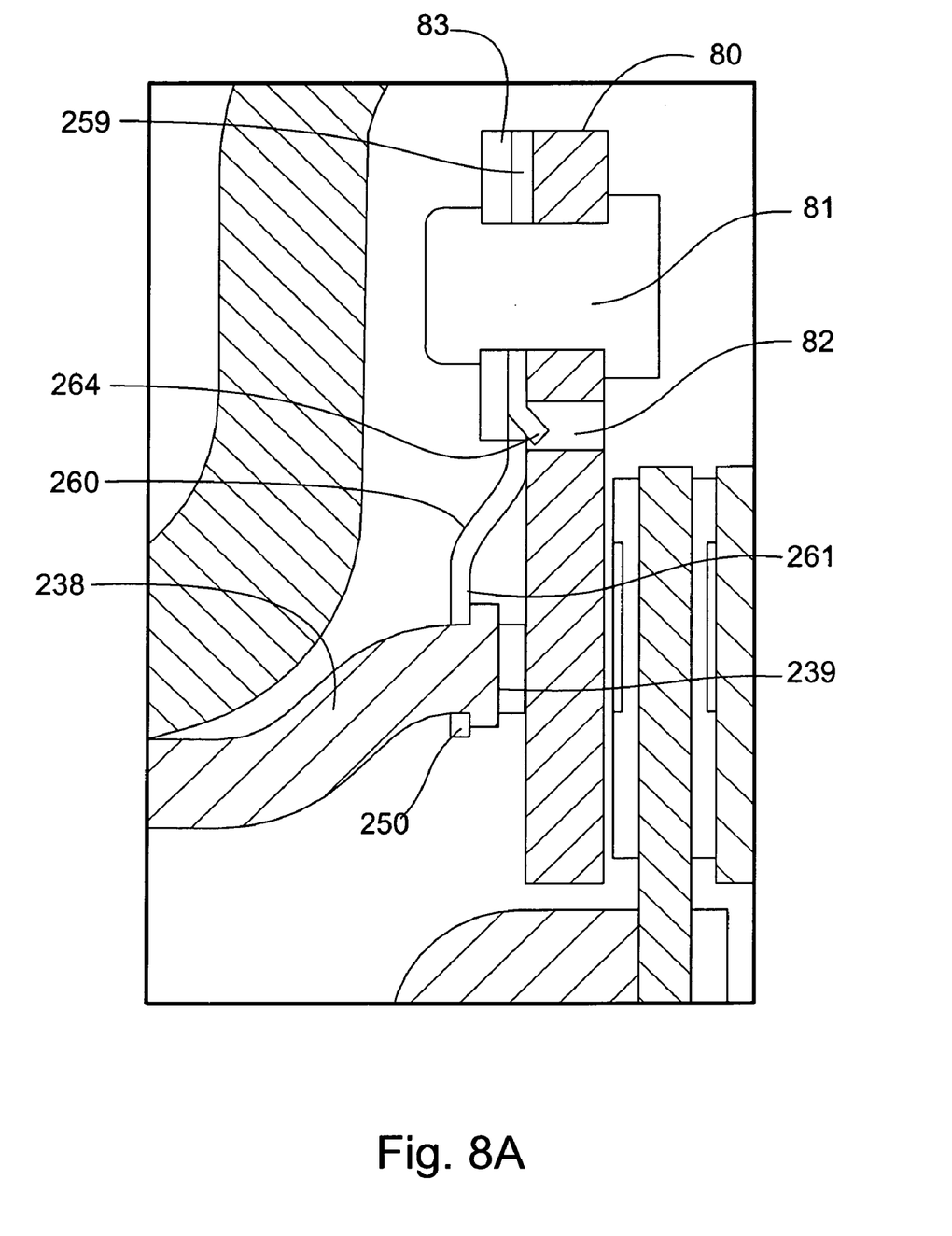
FIG. 8A is an enlarged view of area 8A shown in FIG. 8.

FIG. 8 is a partial cross-sectional view of the fourth embodiment of the present invention piston plate attachment in a torque converter 100. FIG. 8A is an enlarged view of area 8A shown in FIG. 8. As is shown in FIG. 8A, third segment 261 is disposed in plate cut 240. Plate cut 240 and leaf spring 250 are configured such that once third segment 261 is forced into plate cut 240, peg 242 extends through aperture 269, and peg 242 is subsequently upset (smashed), thereby securing third segment 261 in plate cut 240. Leaf spring 250 may be attached to drive plate 80 by any means known in the art. Preferably, it is attached via rivet 81 passing axially through drive plate 80 and aperture 262 of leaf spring 250. Tab 264 extends axially into aperture 82 of drive plate 80 in order to prevent leaf spring 250 rotating about rivet 81.

Figure 9:
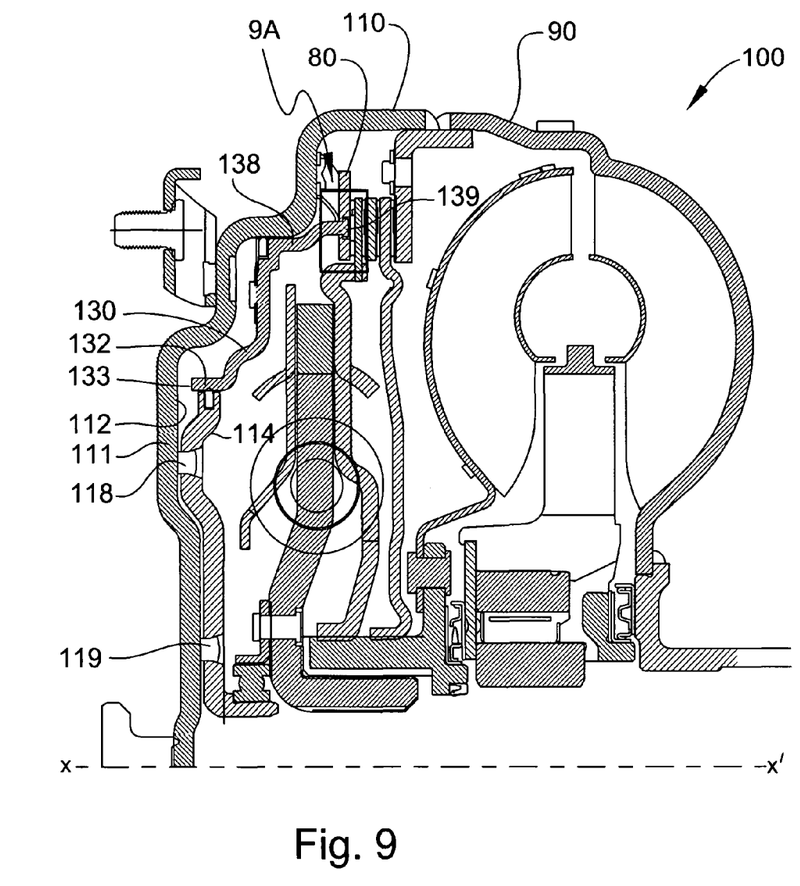
FIG. 9 is a partial cross-sectional view of a fifth embodiment of the present invention piston plate anti-rotate mechanism in a torque converter.
Figure 9A:
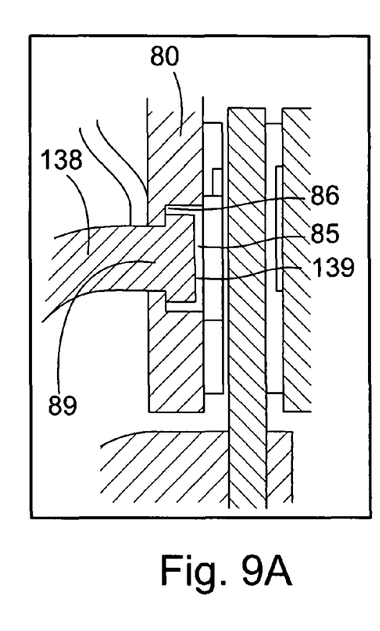
FIG. 9A is an enlarged view of area 9A shown in FIG. 9.

FIG. 9 is a partial cross-sectional view of the fifth embodiment of the present invention piston plate attachment in a torque converter 100. FIG. 9A is an enlarged view of area 9A shown in FIG. 9. In this embodiment, piston plate 130 is directly attached to drive plate 80 at back annular edge 139, thereby preventing its rotation relative to the drive plate and cover, as the drive plate is attached to the cover with leaf springs (not shown). Piston plate 130 is attached to drive plate 80 via at least one piston plate sheet metal rivet 85, which is inserted axially into aperture 89 of drive plate 80, and subsequently upset against surface 86 of drive plate 80. In a preferred embodiment, aperture 89 is counter sunk, thereby allowing the upset rivet 85 to sit below the friction paper (not shown) of the drive plate.

Figure 10:
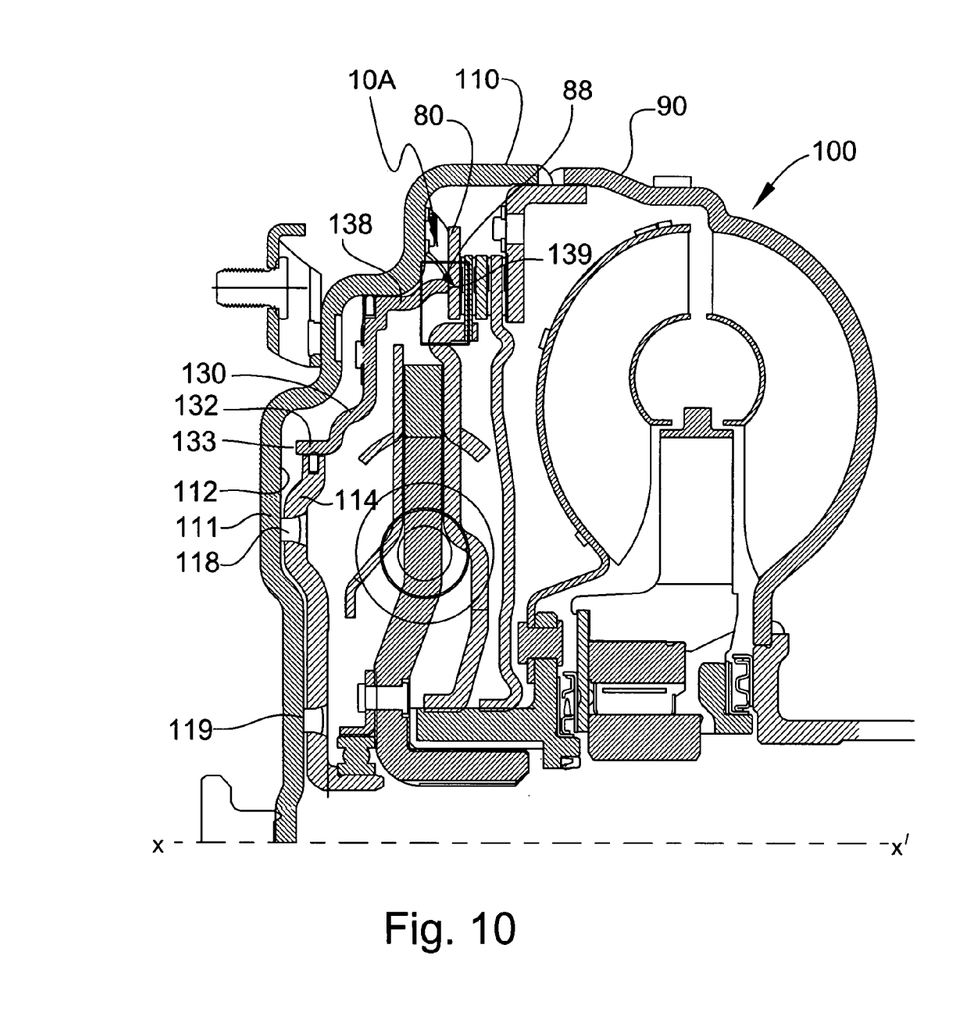
FIG. 10 is a partial cross-sectional view of a sixth embodiment of the present invention piston plate anti-rotate mechanism in a torque converter; and, FIG. 10A is an enlarged view of area 10A shown in FIG. 10.
Figure 10A:
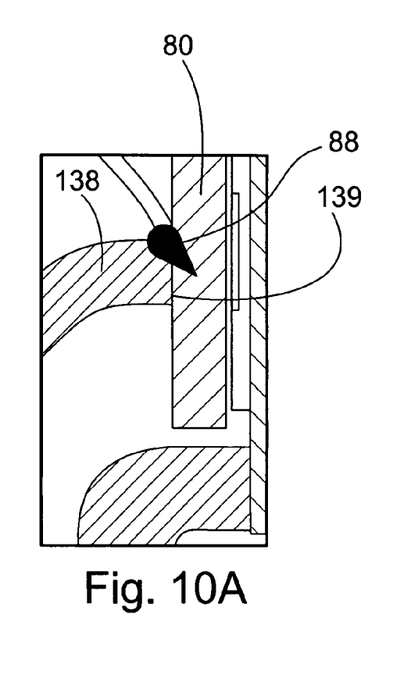

FIG. 10 is a partial cross-sectional view of the sixth embodiment of the present invention piston plate attachment in a torque converter 100. FIG. 10A is an enlarged view of area 10A shown in FIG. 10. In this embodiment, back annular edge 139 of piston plate 130 is directly attached to drive plate 80 via weld 88, thereby preventing its rotation relative to the drive plate and cover, as the drive plate is attached to the cover with leaf springs (not shown).

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What we claim is:

1. A piston plate anti-rotate mechanism in a closed piston, three passage torque converter comprising:
    a cover having an inner radial surface;
    a drive plate comprising an annular plate and at least one aperture, the drive plate being rotationally fixed to the cover;
    a piston plate having an axial inner crown, a front annular edge, an axial skirt, a back annular edge, and at least one plate cut in the axial skirt along the back annular edge; and,
    a generally flat, elongate leaf spring, the leaf spring comprising:
        a first segment having a first aperture, a second aperture, and a tab;
        a second segment; and,
        a third segment, wherein the cover, drive plate, and piston plate are operatively arranged to rotate about a transverse axis of rotation, wherein the at least one plate cut is operatively arranged to receive the third segment of the leaf spring, wherein the third segment of the leaf spring is secured in the plate cut, wherein the first segment of the leaf spring is attached to the drive plate via a rivet, and wherein the tab of the leaf spring extends into the aperture of the drive plate, thereby attaching the piston plate to the drive plate such that the piston plate is axially moveable and rotationally immovable relative to the cover.

2. The piston plate anti-rotate mechanism in a closed piston, three passage torque converter as recited in claim 1 wherein the third segment of the leaf spring includes wing tabs operatively arranged to provide a preload against the plate cut of the piston plate when the third segment is inserted in the plate cut, thereby securing the third segment in the plate cut.

3. The piston plate anti-rotate mechanism in a closed piston, three passage torque converter as recited in claim 1 wherein the plate cut further includes an axially extending peg disposed generally in the middle of the plate cut, and wherein the third segment of the leaf spring includes an aperture operatively arrange to receive the peg when the third segment is inserted into the plate cut.

* * * * *

UNITED STATES PATENT AND TRADEMARK OFFICE
CERTIFICATE OF CORRECTION

| | | |
|---|---|---|
| PATENT NO. | : 8,151,957 B2 | Page 1 of 1 |
| APPLICATION NO. | : 12/315999 | |
| DATED | : April 10, 2012 | |
| INVENTOR(S) | : Hoffmann et al. | |

It is certified that error appears in the above-identified patent and that said Letters Patent is hereby corrected as shown below:

Title page Item (73) should read:

(73) Assignee: Schaeffler Technologies AG & Co. KG, Herzogenaurach (DE)

Signed and Sealed this
Twenty-ninth Day of May, 2012

David J. Kappos
*Director of the United States Patent and Trademark Office*